United States Patent [19]

Powers

[11] Patent Number: 4,609,176
[45] Date of Patent: Sep. 2, 1986

[54] FLUID FLOW CONTROL SYSTEM WITH PULSE DRIVEN ELECTRIC CONTROL VALVE

[75] Inventor: William H. Powers, Tulsa, Okla.

[73] Assignee: Badger Meter, Inc., Milwaukee, Wis.

[21] Appl. No.: 602,653

[22] Filed: Apr. 20, 1984

[51] Int. Cl.$^4$ .............................................. F16K 31/12
[52] U.S. Cl. .................................. 251/30.04; 251/25; 251/129.11; 236/49
[58] Field of Search .................. 251/30, 84, 58, 56, 251/25, 129; 236/49, 73, 76, 82, 84, DIG. 8; 98/41 AV

[56] References Cited

U.S. PATENT DOCUMENTS

| | | | |
|---|---|---|---|
| 2,062,606 | 12/1936 | Powell | 236/74 |
| 2,824,460 | 2/1958 | Davis | 74/424.8 |
| 2,994,794 | 8/1961 | Jordan | 310/68 |
| 3,330,289 | 7/1967 | Grace | 251/56 X |
| 3,434,409 | 3/1969 | Fragnite | 236/49 X |
| 3,677,164 | 7/1972 | Traver et al. | 98/40 |
| 3,796,367 | 3/1974 | Rifkin | 236/49 |
| 3,799,046 | 3/1974 | Gorcher | 98/41 AV |
| 4,312,474 | 1/1982 | Tulowiecki | 236/49 |
| 4,397,223 | 8/1983 | Maxson | 98/41 AV X |
| 4,440,066 | 4/1984 | Anderson | 236/84 X |
| 4,460,009 | 7/1984 | Nanci et al. | 251/58 X |

OTHER PUBLICATIONS

Airpax—Digital Linear Actuators, 1982, brochure, pp. 2, 3, 6.
Badger Meter, Inc.—Research Control Valves, current catalog.
ITT General Controls—Advertisement, publication source unknown.
Fujikin International, Inc.—Electronic Mini-Control Valves, current brochure.
Andale—Bulletin 900, Electric Actuator, Model A300, Linear.
E-Systems, Montek Division—Electric Actuator, Model A300 and A1500, 2 brochures.
Robotics Age, In The Beginning—Copyright 1983, by Robotics Age, Inc., shaded portion of p. 65.

*Primary Examiner*—Larry Jones
*Attorney, Agent, or Firm*—Neuman, Williams, Anderson & Olson

[57] ABSTRACT

An air supply system is provided with multiple direct driven electrical control valves to control the flow of air throughout a building. Each control valve has a variable orifice with a reciprocably adjustable shaped spool, located between the inlet and outlet fittings. An electric stepping motor is directly connected to the spool through a suitable screw thread and spline arrangement to effect this reciprocable adjustment of the spool. Each motor is directly driven by pulses sent from a computer or microprocessor which provides positioning input for the valves in response to sensed conditions, thereby accurately controlling and adjusting flow of air throughout a building air supply system.

13 Claims, 8 Drawing Figures

FLUID FLOW CONTROL SYSTEM WITH PULSE DRIVEN ELECTRIC CONTROL VALVE

BACKGROUND OF THE INVENTION

Field of the Invention

This invention relates to systems for controlling fluid flow in response to electrical pulse control information, such as from a digital computer, microprocessor or the like. Further, this invention relates to improved valves for controlling the rate of fluid flow in such systems.

It is desirable to provide a flow control system wherein flow-rates of control air can be rapidly and accurately varied remotely by automatic control equipment. Such systems previously have often required manually set individual controls for individual settings or, in the alternative, have required position-reading feedback or other additional and/or expensive control equipment. This invention provides both a system and a specific improved valve design meeting these requirements and overcoming prior problems.

Many prior fluid flow control valves proposed for such systems have essentially been pneumatically actuated. Where precise positioning control was necessary, these systems required additional positioning control systems and tended to have slow response time. Various electrically controlled valves using electrical motors required gear trains whereby the ultimate response of the valve was slow as compared to the capability of this invention. A further problem inherent in various prior valves is how to effectively counteract the increase in pressure exerted against the valve as it is driven closer to a fully closed position due to the pressure maintained by the fluid in the system. One solution has been to employ a motor with a drive capacity much larger than needed to counteract this force. However, this results not only in an inefficient use of the motor but also an expensive solution to the problem by using a motor much larger than necessary to operate the valve. In summary, prior art devices have presented numerous shortcomings in applications requiring specific rapid and precise positioning responses particularly where a low-cost valve is required.

This invention provides a simple control including a linearly movable variable orifice valve which is remotely adjusted by electrical control pulses which operate an electric stepping motor to provide direct, precise and exact movement of an internal valve spool. No positional feedback is required. The invention is capable of providing as little as 0.001 inches of linear translation with each control power pulse to the motor depending upon the specific motor selected for use with the valve. By providing the internal spool and orifice with the appropriate dimensions such a valve can produce a linear rate of change in the fluid flow or logarithmic rate change or any other desirable rate adjustment within much more precise and definite limits as compared with prior devices. Accordingly, this device allows for quick response time and accurate fluid flow rate changes in a simple and inexpensive control unit.

OBJECTS OF THIS INVENTION

It is a general object of this invention to provide an improved fluid flow control system with the desirable characteristics noted above.

It is a further object of this invention to provide improved fluid flow control valves responsive to electrical pulse control information.

It is another object of this invention to provide an improved fluid control valve actuated by an electric stepping motor which will provide the valve with precise flow rate and adjustment capability.

It is a further object of this invention to provide fluid flow control systems which are inexpensive and adapted to be conveniently controlled by a central computer, e.g. for uses in heating, ventilation and air conditioning systems.

It is another object of this invention to provide inexpensive control valves which will provide swift and accurate response to external conditions.

SUMMARY OF THE INVENTION

In accordance with one embodiment, multiple bypass valves are connected to control the air supply to bladder-type louvers in a building air supply system and are controlled from a computer, microprocessor or the like which provides positioning signals in the form of electrical pulses. Each control valve is directly driven in response to each such pulse transmitted to that valve. Each valve includes a housing or body with inlet and outlet fittings. Contained within the housing and reciprocally moveable therein is an inner valve which includes a shaped spool or plug adapted to move within an orifice located between the inlet and outlet fittings. An electric stepping motor is connected to the inner valve through a suitable screw thread arrangement to effect reciprocable adjustment of the spool. The motor turns a threaded element which engages a threaded shaft that is secured against rotation therewith whereby the stepping rotation of the motor translates into linear or axial movement of the shaft and hence, linear adjustment movement of the spool. As a result, each pulse of the motor is converted into corresponding incremented linear movement of the spool which, depending on the specific motor used, may be as little as 0.001 inch. Moreover, the spool may be of such a shape or "trim" that the effective change in fluid flow rate per pulse will be a linear, logarithmic or any other type of relationship as a function of the valve position, as desired.

By controlling many individual valves in such a manner the entire system is capable of maintaining a stable and accurately controlled environment through the precise and rapid adjustment of the valves of this invention. Moreover, the valve and controls may be simple and relatively inexpensive.

BRIEF DESCRIPTION OF THE DRAWINGS

For a more complete understanding of this invention reference should now be made to the embodiment illustrated in greater detail in the accompanying drawings and described below by way of examples of the invention.

In the drawings.

It should be noted, of course, that the invention is not necessarily limited to the particular embodiments illustrated herein.

DETAILED DESCRIPTION

Figure 1:
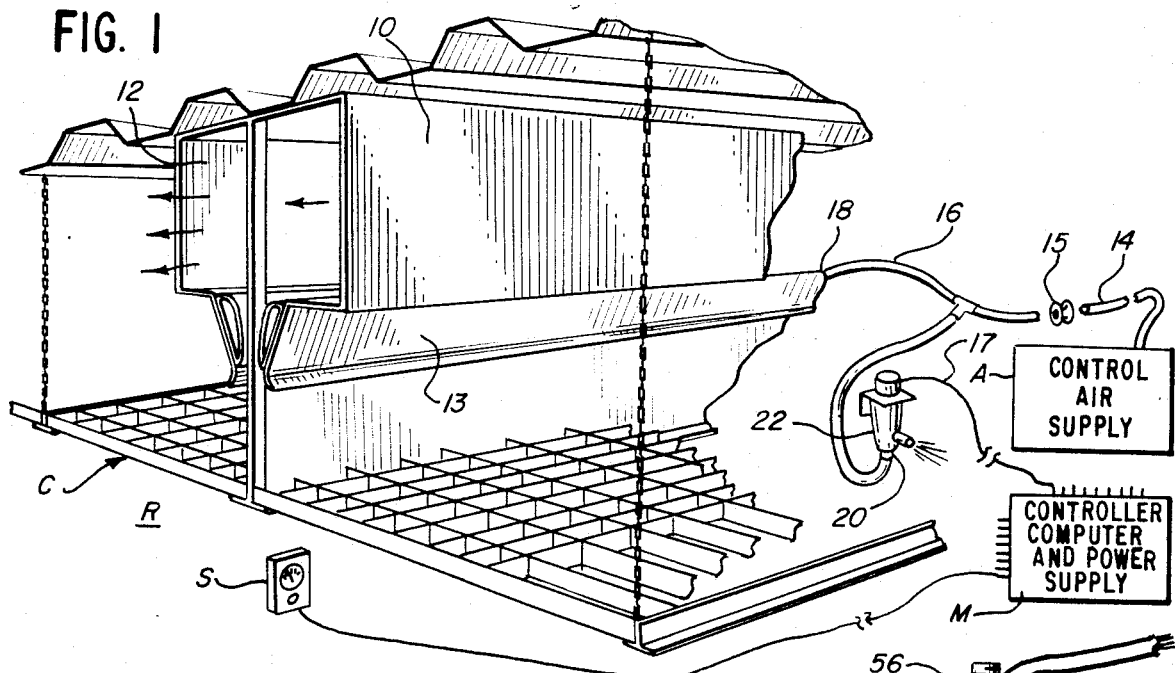
FIG. 1 is a schematic partial perspective view of the air supply control components in a heating, ventilating and air conditioning system employing teachings of this invention.
Figure 2:
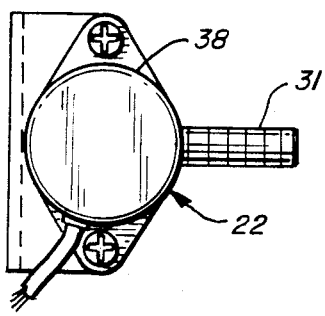
FIG. 2 is a top view of an improved fluid flow valve of the system of FIG. 1, showing the electric pulse motor, its mounting screws, the outlet flow fitting and the mounting bracket for securing the entire device in a fixed position.
Figure 1A:
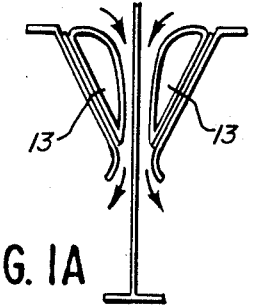
FIG. 1A is an enlarged schematic cross section of the bellows of the system of FIG. 1.

The preferred embodiment of this invention is in heating, ventilation and air conditioning systems requiring a large quantity of control valves. Referring to FIG. 1 the portion of the air system disclosed comprises plenums 10 and 12 with air exit ports of a variable size as controlled by the inflation or deflation of flexible bellows or bladders 13 (See also FIG. 1A), generally as disclosed in U.S. Pat. No. 3,677,164, the disclosure of which is incorporated herein by reference. The present invention is employed to provide control of the inflation/deflation of such bellows. Inflation of the bellows decreases the width of the air exit slots and thereby decreases the air flow from the plenums into the room R and surrounding space beneath the suspended ceiling C. Conversely, deflation of the bellows increases the sizes of the air exit slots and thereby increases the flow of air into the room.

The air is supplied to the plenums through any suitable air conditioning or supply system in a known manner.

The control system includes a remote air supply A of any known type which will supply control air at a low pressure (e.g., 0.5 psi) through a line 14 and a fixed orifice device 15 for each bellows set. Downstream from the orifice 15 is a branched line, including a supply line 16 leading to the respective bellows and another line 17 leading to inlet 20 of a fluid flow control valve 22.

As described further below, the control valve has a variable orifice with a maximum capacity which exceeds the supply rate through orifice 15 and provides controlled bleeding of the control air into the atmosphere. As the control valve 22 is adjusted toward a closed position there will be an increase in the air pressure in the bellows and a decrease of air flow from the plenums to the room. Conversely, whenever the control valve 22 is opened beyond the point at which it permits escaping air flow equal to the supply through the orifice 15, there will be a gradual deflation of the bellows. Thus, by controlling the effective size of the orifice of the valve 22, the degree of inflation of the bellows is regulated to control the air flow into the room.

Figure 3:
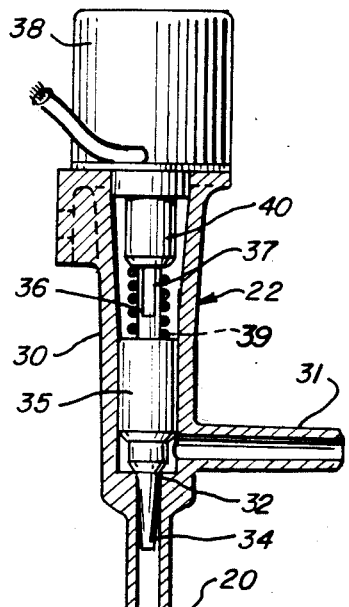
FIG. 3 is a partial sectional view of the valve taken along line 2—2 as seen in FIG. 1 disclosing the internal design of the valve.
Figure 4:
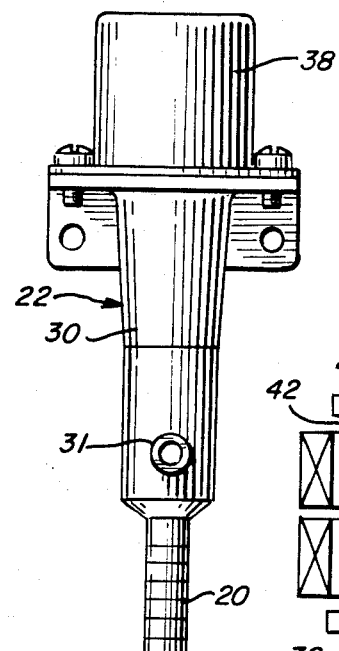
FIG. 4 is a front view of the valve showing the electric pulse motor mounted on top of the valve.
Figure 3A:
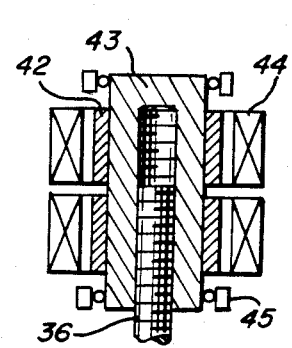
FIG. 3A is a schematic of the internal design of the motor as seen in FIG. 3.

Turning now to FIGS. 3 and 4, the housing 30 of the fluid control valve 22 can readily be seen in its entirety and in cross section. Included as part of the housing 30 are the inlet fitting 20 and outlet fitting 31. An orifice 32 is located between the inlet fitting 20 and the outlet fitting 31. Disposed in this orifice is a tapered or appropriately shaped elongated spool or plug 34. During operation of the valve, spool 34 is moved axially of the plug, within the orifice 32. The spool 34 and the orifice 32 are shaped and adapted to provide predetermined fluid flow rate changes with known axial displacement of spool 34. For example, the spool 34 may be shaped so that changes in flow rate due to movement of spool 34 will be linear, logarithmic or any other desired flow rate change as a function of the position of the spool within the orifice.

Interconnected with the spool 34 is an inner valve 35 and a shaft 36 which is threaded along the upper portion that is disposed within a motor 38. The inner valve 35 and spool 34 are reciprocally adjustable within housing 30, axially of the spool, by a stepping motor 38.

The electric step motor 38 is mounted on the housing 30 and is suitably drive connected directly to the threaded shaft 36, e.g. by means of a hollow threaded rotor 43. The rotor is caused to rotate incrementally within bearing guides 45 by stators 44 and rotor magnets 42. The shaft 36 may extend into the rotor 43 or through the rotor 43 such as in commercially available actuators. The rotary element is densely threaded so as to avoid any slipping of the threaded shaft 36 during operation. The shaft 36 has keyed or spline engagement with the motor housing, e.g. by a keyway 37, to prevent rotation of the valve assembly 34, 35, 36 while permitting reciprocating movement relative to the motor as the rotor and nut are rotated.

The operation of the motor 38 is controlled by an external pulse generator control source, such as a computer or microprocessor M (FIG. 1), for stepping rotation or counter-rotation of the motor by applying an appropriate number of pulses of the appropriate value in response to a control condition. A sensor S, such as a thermostat, provides information to the computer or microprocessor M as to the conditions in the room R. The computer unit is programmed to provide command signals for adjustment of the air supply system appropriate to the sensed condition and the desired norm. The computer unit provides an adjustment signal to valve 22 in the form of a series of power pulses of a value corresponding to whether a greater or lesser amount of air is to be supplied and a number corresponding to the amount or degree of adjustment of valve 22 to be effected. In effect, the pulse motor 38 causes incremental rotational movement of the threaded element driven with its rotor which translates into linear incremental axial movement of shaft 36 thereby driving inner valve 35 and spool 34. Moreover, the electric motor is reversible providing means to move the spool 34, either in or out of the orifice 32 simply by the value of the applied pulses.

Due to the low fluid pressure maintained in the heating, ventilation and air conditioning system described above, the preferred embodiment of this invention is able to employ a relatively small motor, e.g., one providing twenty ounces of thrust and forty ounces of holding force. This amount of thrust, when coupled with the threaded arrangement of the rotor nut and the shaft 36, provides sufficient thrust to completely close the valve. One specific example of such a motor is capable of producing a maximum 437 pulse movements in one direction for about one-half inch total linear travel of the inner valve assembly, with 0.002 inches of linear travel of the spool 34 per pulse. A commercially available motor having such capability is Airpax "Bidirectional Linear Actuator" Model K92121-P2.

The control provided by the present system will not only be extremely precise in movement providing a more efficient ventilation system but will be inexpensive to produce due to the small motor required for operation, the simple unitary molded valve body and few inner valve components, and the absence of any positional feedback components. The housing 30 preferably is constructed of molded plastic providing inexpensive manufacture.

It is to be noted that in the illustrated embodiment the inner valve 35 is not provided with any separate seal between it and the inner wall of housing 30. Accordingly, small amounts of the control air, which is under pressure when the valve is integrated into an air control system, will be permitted to continuously escape around the inner valve 35 and purge the motor 38 of any dust. This arrangement will, therefore, provide the drive motor with longer life and require less maintenance. However, the valve 22 of this invention is readily adaptable for use with various fluids. By placing a suitable seal, such as an "O"-ring between the inner valve 35 and the inner wall of housing 30, the valve 22 is easily adapted for use with corrosive or toxic fluids.

The valve 22 may also be modified by including a spring, in compression, between the motor housing extension 40 and the inner valve 35. This spring (shown in phantom lines at 39 in FIG. 3) would, therefore, provide a constant expansion force biasing the valve toward the closed position and would aid the motor in counteracting the back pressure of the fluid maintained in the system when attempting to decrease the flow rate by extending the spool for decreasing the orifice opening.

In keeping with the invention it is noted that the valve 22 is capable of many uses beyond that disclosed above. Depending on the outcome desired and the conditions under which the valve will operate, the motor employed may be changed to provide a motor with greater thrust or greater or less linear movement per pulse of the motor.

Figure 5:
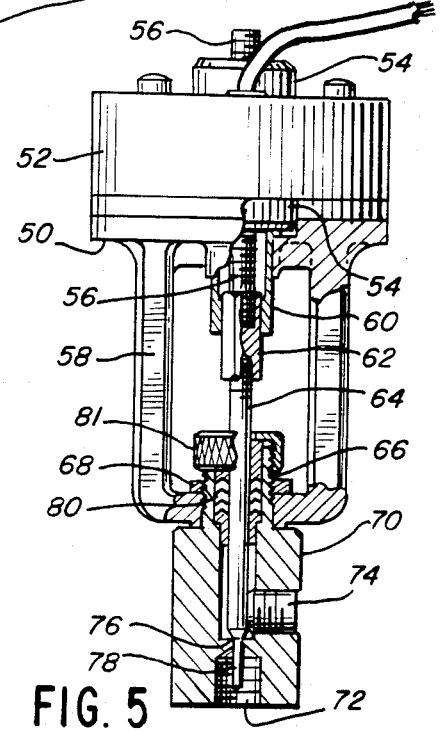
FIG. 5 is a partial sectional view of an alternative embodiment of a fluid control valve employing teachings of this invention, disclosing the internal design of the alternative embodiment.
Figure 5A:
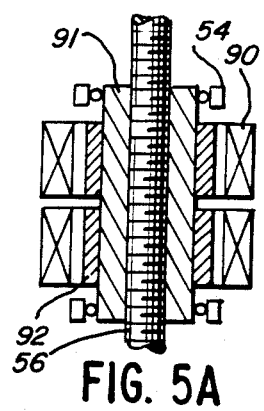
FIG. 5A is a schematic of the internal design of the motor as seen in FIG. 5.

Another embodiment of the fluid control valve is show in partial cross-section in FIG. 5. Here, the valve 50 is comprised of a motor 52 mounted on a yoke 58. The motor 52 contains a pair of bearing housings 54 with a threaded shaft 56 extending through these housings and protruding at both ends. The threaded shaft 56 extends into the yoke 58 through a hollow cylindrical housing portion 60. The inside walls of the hollow cylindrical housing 60 are hexagonal shaped for receiving a hexagonal shaped nut 62 securely engaged to the bottom of threaded shaft 56. Securely engaged at the other end of the hexagonal nut 62 is a spool shaft 64 which extends into the bonnet or orifice body 70. Orifice body 70 may be of an integral construction as shown or a more conventional two-piece bonnet design, and has inlet and outlet fittings 72 and 74, respectively. The body 70 is connected to a yoke 58 by means of a threaded neck 66 and ring nut 68.

Orifice body 70 has a cylindrical bore for accepting the spool shaft 64 disposed on the end of which is a tapered or shaped spool 78. An orifice passage 76 is formed between inlet fitting 72 and outlet fitting 74 and is designed and adapted to accept spool 78 and defines a variable orifice therewith. The valve 50 is designed for operation with various fluids and higher pressures than value 22, e.g., as a freon expansion valve. To that end a packing gland seal 80 is compressed around shaft 64, beneath nut 81.

During operation of the motor 52, a hollow threaded rotor 91 disposed within bearings 54 is caused to rotate incrementally by stators 90 and rotor magnets 92 as power pulses are applied to the motor. The nut engages shaft 56 which is held against rotation by the spline or keyed connection 60, 62. Accordingly, the threaded shaft 56 is caused to translate up or down within the bearing housings 54 depending upon the direction of rotation of the motor. The hexagonal nut 62 securely attached to the threaded shaft 56 similarly slides longitudinally within the hexagonal shaped inner walls of the hollow cylindrical housing 60 as it prevents the threaded shaft 56 from rotating. The linear movement of the threaded shaft 56 and the hexagonal nut 62 provide corresponding linear movement of the spool shaft 64 which causes the tapered spool 78 to be adjusted longitudinally within the orifice 76. The spool 78 and the orifice 76 are shaped or "trimmed" to provide predetermined fluid flow rate changes with axial displacement of the spool 78.

In this alternative embodiment, the same advantages of accurate incremental movement are provided but the motor is more powerful thereby providing a greater range of fluid use. One commercially available motor contemplated for use is the Airpax "Bidirectional Linear Actuator" Model L92411-P2, which provides 0.001 inches of linear travel per pulse of the motor and can supply approximately 60 ounces to 25 pounds of force.

Whereas a preferred embodiment and certain alternative designs have been shown and described herein, it will be apparent that other modifications, alterations and variations may be made by and will occur to those skilled in the art to which this invention pertains, particularly upon considering the foregoing teachings. It is, therefore, contemplated by the appended claims to cover any such modifications and other embodiments as incorporate those features which constitute the essential features of this invention within the true spirit and scope of the following claims.

What is claimed is:

1. A fluid flow control system comprising: means positionable in response to the pressure of a control fluid for controlling the flow of another fluid; means for supplying control fluid at a predetermined rate; a conduit connecting said supplying means to said controlling means; a bypass connected to said conduit and including a control valve having a variable orifice; said valve comprising a housing with inlet and outlet fluid flow fittings and defining an orifice passageway therebetween, and a spool portion reciprocally adjustable within said passageway; and an electrical stepping motor including a rotor portion; said spool portion being attached to an element having threaded engagement with said rotor portion of said motor whereby said spool portion is adjusted axially as said motor is stepped, and said spool portion being shaped to vary the effective size of the orifice defined by said passageway and spool portion as said spool portion is reciprocated by said motor in response to electrical control pulses to said motor, whereby the flow of such control fluid from said supplying means through said bypass is controlled by applying electrical pulses to said motor to thereby selectively position said controlling means.

2. An air flow control system comprising: flow control means adjustably responsive to the pressure of control air; a variable orifice valve comprising a housing with inlet and outlet fluid flow fittings and defining an orifice passageway therebetween, and a spool portion reciprocally adjustable within said passageway; a control air flow system, said control flow system comprising a remote air supply and a supply line providing control air at a predetermined rate, two branch lines communicating with said supply line, one of said branch lines also communicating with said flow control means and the other branch line also communicating with the variable orifice of said valve; an electric stepping motor including a rotor portion; said spool portion being attached to an element having threaded engagement with said rotor portion of said motor whereby said spool portion is adjusted axially as said motor is stepped, and said spool portion being shaped to vary the effective size of the orifice defined by said passageway and spool portion as said spool portion is reciprocated by said motor, and means for supplying electrical pulses to said motor for adjusting said spool portion within said orifice to vary said orifice and thus vary the flow through said other branch line and thereby adjust the pressure of control air in said flow control means.

3. An electric control valve comprising the combination of a housing with inlet and outlet fluid flow fittings and defining an orifice passageway therebetween, a valve body reciprocally adjustable within said housing and including a spool portion disposed in said passageway and defining an orifice therebetween, a reversible electric stepping motor mounted on said housing, a driven shaft reciprocated by said motor and connected to said spool portion so that said shaft translates the rotation and counter-rotation of said motor into linear movement of said spool portion providing adjustable positioning of said spool portion in said passageway and thereby altering the size of said orifice defined therebetween, and a seal disposed between said valve body and the inner wall of said housing providing a seal between said orifice and said motor.

4. An electric control valve comprising the combination of a housing with inlet and outlet fluid flow fittings and defining an orifice passageway therebetween, a valve body reciprocally adjustable within said housing and including a spool portion disposed in said passageway and defining an orifice therebetween, a reversible electric stepping motor mounted on said housing, a driven shaft reciprocated by said motor and connected to said spool portion so that said shaft translates the rotation and counter-rotation of said motor into linear movement of said spool portion providing adjustable positioning of said spool portion in said passageway and thereby altering the size of said orifice, and a compression spring disposed between said valve body and an element fixed to said housing for applying a force to said valve body and spool portion in a direction for decreasing the orifice opening.

5. The invention of claim 1 or 2 including computer means for providing driving pulses to said motor for adjusting said orifice in response to predetermined parameters.

6. The invention of claim 3 or 4 wherein said reversible electric motor includes an internally threaded rotor, said rotor receptively engaging an externally threaded portion of said shaft whereby rotation of said rotor causes said shaft to move linearly within said housing.

7. The invention of claims 1, 2, 3, 4, 5 or 6 wherein said housing, orifice passageway, and inlet and outlet fittings are of unitary construction.

8. The invention of claim 7 wherein said housing, orifice passageway and inlet and outlet fittings are molded plastic.

9. The fluid flow control system of claim 1, wherein said means positionable in response to the pressure of a control fluid for controlling the flow of another fluid includes a controllably inflatable and deflatable bladder means.

10. The invention of claim 2 wherein said motor is a reversible electric stepping motor mounted on said housing, and including a driven shaft reciprocated by said motor and connected to said spool portion so that said shaft translates the rotation and counter-rotation of said motor into linear movement of said spool portion providing adjustable positioning of said spool portion within said orifice passageway.

11. The air control system of claim 10 wherein said spool portion is non-rotating.

12. The air control system of claims 2, 10 or 11, wherein said flow control means adjustably responsive to the pressure of control air includes a controllably inflatable and deflatable bladder means.

13. The electric control valve of claim 3 or 4, wherein said valve body and said spool portion are non-rotating with respect to said valve housing.

* * * * *